United States Patent [19]

Ovretveit

[11] Patent Number: 5,148,858
[45] Date of Patent: Sep. 22, 1992

[54] HEAT EXCHANGER CONNECTED TO A WASTE WATER DISCHARGE CONDUIT

[75] Inventor: Hans Å. Øvretveit, Telavag, Norway

[73] Assignee: Telavag Energiteknikk A/S, Telavag, Norway

[21] Appl. No.: 601,739

[22] PCT Filed: Apr. 27, 1989

[86] PCT No.: PCT/NO89/00037
§ 371 Date: Dec. 10, 1990
§ 102(e) Date: Dec. 10, 1990

[87] PCT Pub. No.: WO89/10521
PCT Pub. Date: Nov. 2, 1989

[30] Foreign Application Priority Data
Apr. 29, 1988 [No] Norway .................. 881869

[51] Int. Cl.$^5$ .............. F24J 3/00; F28D 7/00
[52] U.S. Cl. ........................ 165/38; 165/35; 165/76; 165/47; 165/103; 165/66; 165/143; 165/909; 165/158; 4/545
[58] Field of Search ............. 165/47 BW, 143, 909, 165/158, 66, 38, 35, 76, 103; 4/545

[56] References Cited
U.S. PATENT DOCUMENTS

| 1,539,267 | 5/1925 | Muhleisen | 165/143 |
| 1,841,528 | 1/1932 | Gebhardt | 165/143 |
| 1,955,477 | 4/1934 | Turner | 165/95 |
| 1,989,340 | 1/1935 | Shepherd | 165/101 |
| 3,048,372 | 8/1962 | Newton, Jr. | 165/143 |
| 3,361,194 | 1/1968 | Cowlin | 165/66 |
| 3,439,738 | 4/1969 | Dixon et al. | 165/143 |
| 3,948,315 | 4/1976 | Powell | 165/143 |
| 4,874,035 | 10/1989 | Kashiwada et al. | 165/38 |

FOREIGN PATENT DOCUMENTS

| 177151 | 6/1953 | Austria | 165/143 |
| 2538168 | 3/1977 | Fed. Rep. of Germany . | |
| 2550320 | 5/1977 | Fed. Rep. of Germany | 165/47 |
| 3113784 | 10/1982 | Fed. Rep. of Germany | 165/47 |
| 3212913 | 10/1983 | Fed. Rep. of Germany . | |
| 3212914 | 10/1983 | Fed. Rep. of Germany . | |
| 2579312 | 9/1986 | France | 165/47 |
| 319628 | 9/1929 | United Kingdom | 165/143 |
| 387498 | 3/1933 | United Kingdom . | |
| 2070758 | 9/1981 | United Kingdom . | |
| WO84/02180 | 8/1983 | World Int. Prop. O. . | |

Primary Examiner—John K. Ford
Attorney, Agent, or Firm—Francis C. Hand

[57] ABSTRACT

A water discharge conduit is disposed in a downwardly inclined direction for receiving a flow of waste water at an upper end, for example, from baths, showers and the like. A water trap is disposed below the conduit in parallel relation and has an intake union to receive a flow of hot waste water from the discharge conduit and a discharge union at an opposite end for discharging the waste water back into the conduit. A plurality of pipes extends through the horizontally disposed water trap for conducting fresh water therethrough in heat exchange relation with the flow of hot waste water in the water trap.

13 Claims, 2 Drawing Sheets

HEAT EXCHANGER CONNECTED TO A WASTE WATER DISCHARGE CONDUIT

The present invention relates to a heat exchanger for heat energy-containing discharge water, for example used hot water from baths, showers etc., connected to a water discharge conduit preferably sloping obliquely downwards.

Hitherto it has been usual to allow the heat energy in used hot water from example bath tubs, shower installations and the like not only in conventional units of habitation, hotels, institutions of various types, but also in public baths and the like to disappear in the sewer together with the used hot water, In other words, in spite of high prices for thermal power, a large waste of heat energy has been accepted. A main reason for this has certainly resided in not having realised any possibility for the economic utilisation of the thermal energy content in the said used hot water.

With the present invention the aim is to produce a heat exchanger which is well suited for the purpose and which is functionable even after use over a long period.

The heat exchanger according to the invention is characterised in that the heat exchanger is defined in one or more water trap(s) coupled in parallel or series, which are arranged substantially horizontally at a level just below the water discharge conduit and which are coupled parallel to the water discharge conduit, the water trap having an inlet at an intake union connected upstream to the water discharge conduit for the used hot water and an outlet at a discharge union connected downstream to the water discharge conduit for the used hot water. In this construction the volume of fresh water of the heat exchanger, which is defined in one or more pipes mounted between opposite end covers of the water trap, largely corresponds or is somewhat smaller than the volume of discharge water of the water trap, and that the volume of discharge water of the water trap is preferably substantially greater than the volume of the water discharge conduit between its upstream end and its downstream end.

According to the invention there is the possibility to form in connection with the water trap a storage space for hot water designed for the supply of pre-heated, that is to say partially heated fresh water. Gradually, as the heated fresh water is drawn off from the hot water storage space for bath tubs, showers or other purpose, it can be refilled with a corresponding amount of partially heated fresh water from the heat exchanger. The volume in the water trap and in the pipes of the heat exchanger for fresh water must clearly be adjusted after each individual use application. The larger the flow is of used hot water in the water trap, the larger becomes the supply of heat to the pipes for the fresh water. With a smaller flow of used hot water a certain loss of heat to the suroundings can obviously occur.

If the water trap should cease to function for one or another reason, for example on stoppage by substances from the discharge water, there is hereby the possibility of allowing the discharge water to circulate freely and unhindered outside the water trap.

Further features of the invention will be evident from the following description having regard to the accompanying drawings, in which.

Figure 1:
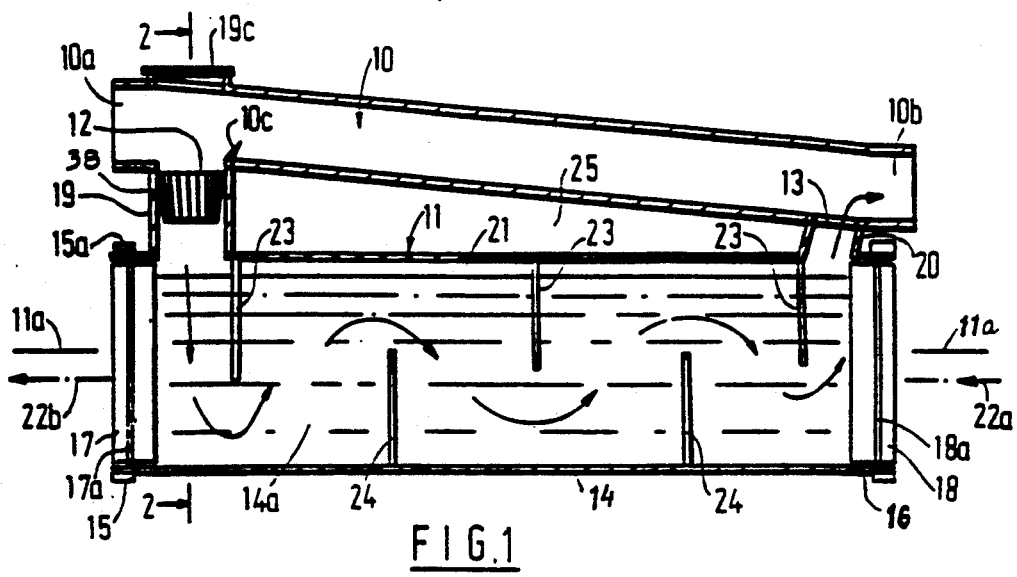
FIG. 1 shows a vertical section of a heat exchanger according to the invention in connection with a pipe section of a water discharge conduit.

In FIG. 1 there is shown a pipe section 10 of a water discharge conduit which communicates with one or more discharge pipes from baths, showers or similar hot water consuming equipment. The pipe section 10 constitutes an unregulated overflow for a water trap 11. The pipe section 10 is shown with an outline sloping obliquely downwards relative to a horizontal main axis 11a—11a of the water trap 11 which is arranged just below the pipe section 10. The pipe section 10 is provided at its upstream end 10a with a radially opening outlet opening 12 directed vertically downwards in the bottom of the pipe section 10 and an equivalent radially opening inlet opening 13 directed vertically upwards in the bottom of the pipe section 10 at the downstream end 10b of the pipe section.

The water trap 11 is formed by a housing 14 which can be pipe-shaped opposite pipe ends 15, 16 (FIG. 1) of which are sealed off with circular, disc-shaped end covers 17, 18 for defining a chamber 14a which can be cylindrical internally in the housing 14. The chamber 14a communicates with upstream end 10a of the pipe section 10 via an intake union 19 directed radially outwards from the housing 14, which is connected to outlet openings 12 in the pipe section 10, and with downstream end 10b of the pipe section 10 via an outlet union 20 directed radially outwards from the housing 14, which empties into the inlet opening 13 of the pipe section 10 at a lower level than the outlet opening 12. In the intake union 19, which is substantially longer than the outlet union 20, there is inserted a filter 38 which can be taken out for cleaning via a hatch 19c, at a level below the outlet opening 12, while in the outlet union 20 there is free and unhindered discharge from the water trap 11 to the pipe section 10. The pipe section 10 is shown having a relatively strongly sloping angle relative to the main axis 11a—11a of FIG. 1, but if desired the sloping angle can be adjusted in practice to have such a small angle relative to the main axis 11a—11a, that the bulk of the used hot water or almost all the used hot water is emptied into the water trap 11, but at the same time so as to prevent the water, which is emptied from the water trap 11 at the down stream end 10b of the pipe section 10, flowing back towards the intake union 19 of the water trap 11. If necessary a flow-hindering threshold 10c (FIG. 1, 2) can be arranged between the outlet opening 12 and the inlet opening 13, and preferably arranged downstream just by the outlet opening 12.

Between the end covers 17, 18 rigidly connected to the latter one or more separate pipes 21 are fixed in which form passages for fresh water. By means of the end covers 17, 18 and the pipes 21 a continuous set of pipes is formed which can be readily mounted and dismounted in the housing 14. The end covers 17, 18 are each provided with at least one sealing ring 17a and 18a respectively (FIG. 4), which form a sealing abutment directly against the inner wall 14 of the housing. The pipes 21 are axially readily mountable and dismountable in holes in end cover member 17c whereby the pipes 21 are connected to a chamber 17f (FIG. 4) in the end cover 17 (FIG. 1) and the chamber 17f is connected to outlet 22b (FIG. 4) of a fresh water conduit which is indicated in FIG. 1 by a broken line 22b. A similar arrangement is employed for the end cover 18 with an inlet of a fresh water conduit which is indicated by a broken line 22a in FIG. 1. By means of the housing 14 with associated intake and outlet unions 19, 20 and the end covers 17, 18, the pipes 21, partition walls 23, 24 and associated connecting means to inlet and outlet 22c, 22d of the fresh water conduits there is formed an effective heat exchanger. The housing 14 in the illustrated embodiment of FIG. 1 is rigidly connected to the pipe section 10 via the intake and outlet unions 19, 20 respectively, while the pipes 21 are dismountably fastened in the housing 14 for cleaning of the pipes 21 with the end covers 17 and 18 together with inner wall 14c (FIG. 4) of the housing.

Provision is made for the fresh water conduit 22a (FIG. 1) to extend into the heat exchanger on the downstream side of the flow path of the used hot water in the water trap 11, so that the usual counterflow effect is ensured with gradual heating of the fresh water from the downstream side of the discharge water towards its upstream side.

The water trap 11 is partitioned off as shown in FIG. 1 over a cross-sectional area of pipe cross-section (FIG. 2) of the housing 14 by means of one or more upper partition walls 23 (FIG. 1) and one or more lower partition walls 24, which are erected spaced apart so that a zig-zag shaped flow path is produced for heat energy-containing used hot water from the pipe section 10 and axially through the water trap 11. The pipes 21 go through and are fastened to one or more of the partition walls 23, 24 respectively. The partition walls are installed and are drawn out of the housing 14 together with the pipes 21.

Figure 2:
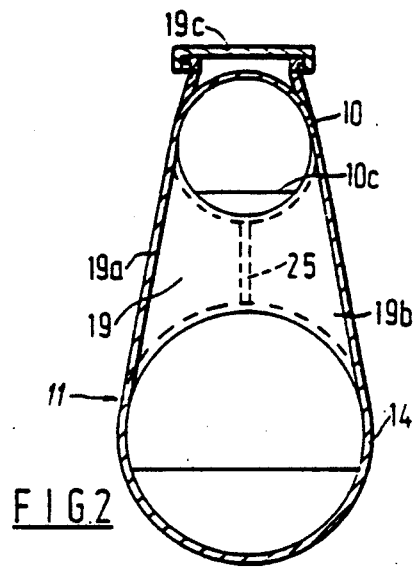
FIG. 2 shows a section along the line 2—2 of FIG 1.

As is shown in FIG. 2, the opening 12 can span over an arc of about 190° of the pipe cross-section of the pipe section 10. The intake union 19 has a downwardly increasing cross-section achieved by allowing opposite side portions 19a and 19b to diverge relative to each other in a direction downwards towards the water trap 11. The internal volume of the water trap 11 can thereby be expanded with a significant extra volume in order to compensate for the inertia in the flow of water through the water trap 11. By broken lines there is shown a support rib 25 which extends axially in the intermediate space between the pipe section 10 and the water trap 11 and which braces the latter mutually over the major portion of their dimension, that is to say between outlet and inlet openings 12 and 13.

The construction is such that the volume of fresh water in the heat exchanger, defined in the pipes 21 mounted between the opposite end covers 17, 18 of the water trap 11, largely corresponds or is somewhat smaller than the volume of discharge water of the water trap 11. In addition, the volume of discharge water in the water trap 11 is preferably substantially greater than the volume of the water discharge conduit 10 between the upstream end 10c and the downstream end 10b.

Figure 3:
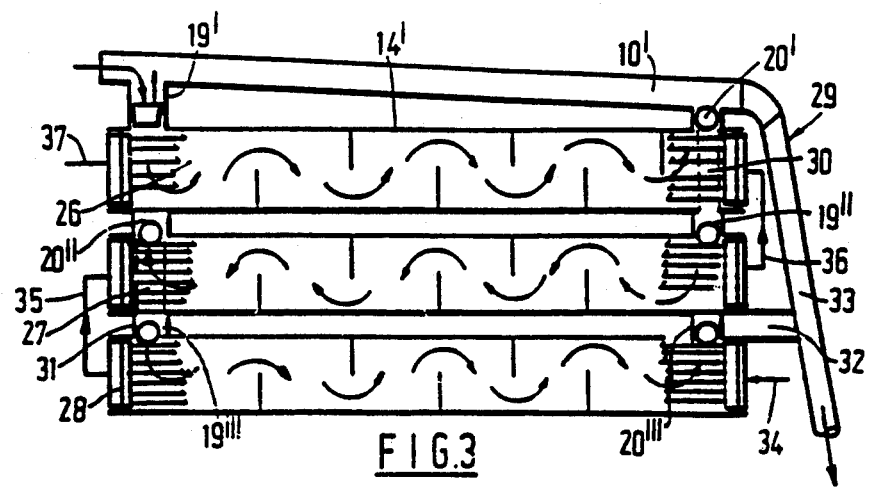
FIG. 3 shows an example of heat exchangers coupled in series in connection with a water discharge conduit.

In FIG. 3 there is shown an example of an alternative arrangement of a battery of heat exchangers where three heat exchangers 26, 27, 28 are arranged connected to one and the same downwardly extending water discharge conduit 29 for heat energy-containing used hot water.

Figure 4:
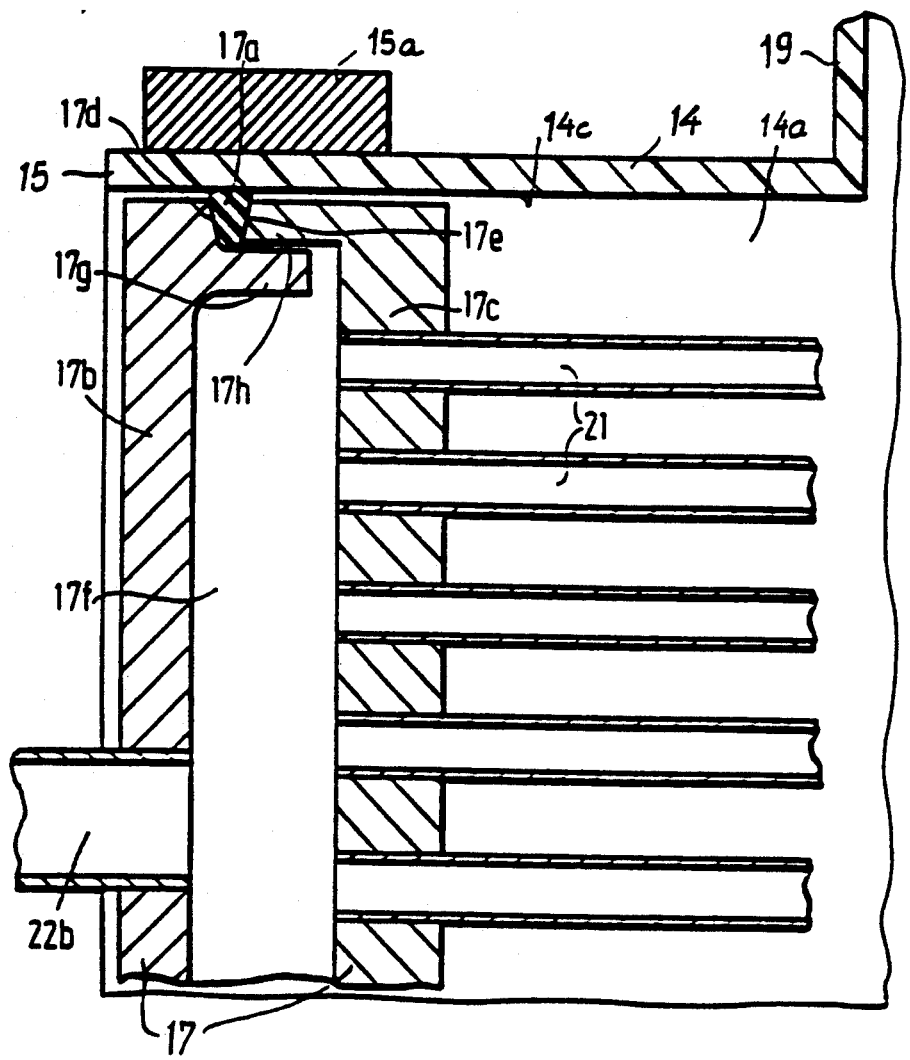
FIG. 4 shows a part of FIG. 1.

The heat exchanger 26 can be designed equivalently as shown for the heat exchanger according to FIG. 1, 2 and 4, housing 14' of the heat exchanger being rigidly connected to an associated pipe section 10' via an intake union 19' and an outlet union 20' (FIG. 3).

The heat exchangers 27 and 28 can be constructed fundamentally in a manner corresponding to the heat exchanger 26.

The heat exchanger 27 is connected to the outlet union 20' of the heat exchanger 26 via an external pipe 30 at a level just below the outlet opening of the outlet union 20' in the pipe section 10'. The connecting pipe 30 empties into intake union 19'' of the heat exchanger 27 at a level just below the heat exchanger 26.

The heat exchanger 28 is connected to outlet union 20'' of the heat exchanger 27 via an external connecting pipe 31 at a level just above the heat exchanger 28. The connecting pipe 31 empties into intake union 19''' of the heat exchanger 28 just below the heat exchanger 27. Outlet union 20''' of the heat exchanger 28 is connected via a pipe stump 32 to a relatively steeply downwardly extending water discharge conduit 29 which is connected to the downstream end of an overflow conduit 33.

Instead of arranging the heat exchangers vertically under each other it is also possible to arrange the latter substantially horizontally by the side of each other, by disposing inlet openings and outlet openings of the heat exchangers at mutually different levels.

There is shown a feed conduit 34 for fresh water which extends inwardly into the heat exchanger 28 at its downstream end for the discharge water, as shown to the right in the drawing. To the left in the drawing there is shown a connecting conduit 35 between the heat exchangers 28 and 27. Correspondingly there is shown to the right of the drawing a connecting conduit 36 between the heat exchangers 27 and 26 and to the left of the drawing there is shown a discharge conduit 37 for fresh water which is heated in the battery of heat exchangers 26–28. From FIG. 3 it is evident that the fresh water is led in counterflow to the used hot water in each of the heat exchangers 26–28 and through each and all of heat exchangers 26–28. By this a heat energy storage space can be obtained with gradually increasing heat content in the three heat exchangers from feed conduits 34 for fresh water to discharge conduits 37 for fresh water.

In the embodiment of FIGS. 1 and 4 housing 14 of the water trap is, radially just outside the end cover 17 with associated sealing ring 17a, surrounded by a rigid reinforcing ring 15a. In this embodiment the housing 14 can be made of relatively rigid and non-elastic material, the reinforcing ring 15a mainly serving as a reinforcing means for the pipe end portion of the housing 14.

In another embodiment as shown in FIG. 4, water trap housing 14 is made of somewhat elastically yielding material, the reinforcing ring 15a in addition to forming a reinforcing means, can also serve as a rigid counter to internal tension forces.

According to FIG. 4 the end cover 17 is divided into two separate parts, namely a disc-shaped end cover part 17b, which forms support means for a centrally arranged discharge pipe 22b, and a disc-shaped end lid 17c, which forms a support means for the pipes 21 in the water trap housing 14. End cover part 17b and end lid 17c are connected to each other by means of their respective axially directed flanges 17g and 17h. By axially pressing together end cover part 17b and end lid 17c via the flanges 17g, 17h, the sealing ring 17a is received between two wedge surfaces 17d and 17e that is to say a wedge surface 17d on the end cover part 17b and an opposite wedge surface 17e on flange 17h of the end lid 17c. In this way, a radially outwardly directed force can be exerted via the sealing ring 17a towards the inner side of the water trap housing 14. Due to the sealing ring 17a being arranged in a groove in the passage between wedge surface 17d of the end cover part 17b and wedge surface 17e of the end lid 17c, both the chamber 17f and the water trap chamber 14a can be sealed off with one and the same sealing ring 17a. A corresponding end cover arrangement is also employed for the end cover 18 without this being shown in detail herein.

What is claimed is:

1. In combination,
   a water discharge conduit disposed in a downwardly inclined direction for receiving a flow of waste water at an upper end, said conduit having a radially directed outlet opening at said upper end for discharging hot waste water therethrough and a radially directed inlet opening at a lower end;
   a horizontally disposed water trap disposed below said conduit in parallel relation, said trap having an intake union at one end communicating with said outlet opening of said conduit to receive a flow of hot waste water therefrom and a discharge union at an opposite end communicating with said inlet opening of said conduit to discharge the flow of waste water into said conduit; and
   a plurality of pipes extending through said trap for conducting flows of fresh water therethrough in heat exchange relation with the flow of waste water in said trap.

2. The combination as set forth in claim 1 wherein said trap includes a pipe-shaped housing receiving said pipes in parallel relation, and a pair of disc-shaped end covers, each cover being sealingly disposed at a respective end of said housing and having said pipes mounted therein.

3. The combination as set forth in claim 2 wherein each cover has an internal chamber communicating with said pipes to transfer fresh water therebetween.

4. The combination as set forth in claim 3 wherein one of said covers has an inlet to said chamber thereof to deliver fresh water thereto and the other of said covers has an outlet to said chamber thereof to discharge heated fresh water therefrom.

5. The combination as set forth in claim 2 which further comprises a plurality of baffle plates mounted on said pipes within said housing to define a zig-zag flow path for the flow of waste water.

6. The combination as set forth in claim 5 wherein said covers, said pipes and said baffle plates form a coherent unit slidably mounted in said housing.

7. The combination as set forth in claim 2 wherein at least one end cover includes a cover part and a lid defining a chamber therebetween in communication with said pipes.

8. The combination as set forth in claim 7 which further comprises an annular sealing ring between said cover part and said lid, said ring being disposed in sealing contact with said housing.

9. The combination as set forth in claim 8 wherein said cover part has an axially extending flange and said lid has an axially extending flange, said flanges being disposed in overlapping relation.

10. The combination as set forth in claim 9 wherein said cover part has a wedge-shaped surface engaging said sealing ring and said flange of said lid has a wedge-shaped surface engaging said sealing ring.

11. The combination as set forth in claim 1 having at least a second water trap below said conduit, said second water trap having an intake union at one end communicating with said discharge union of the first water trap to receive a flow of waste water therefrom and a discharge union at an opposite end.

12. The combination as set forth in claim 11 which further comprises a second discharge conduit extending downwardly from a lower end of the first discharge conduit and a pipe stump communicating said discharge union of said second water trap with said second discharge conduit.

13. The combination as set forth in claim 11 which further comprises a plurality of pipes extending through said second trap for conducting fresh water therethrough and being connected in series with said pipes of said first water trap.

* * * * *